United States Patent
O'Herlihy et al.

(10) Patent No.: US 11,257,017 B2
(45) Date of Patent: Feb. 22, 2022

(54) DISTRIBUTED LOGBOOK FOR ANOMALY MONITORING

(71) Applicant: Everseen Limited, Blackpool (IE)

(72) Inventors: Alan O'Herlihy, Glenville (IE); Joe Allen, Ballybunion (IE); Dan Pescaru, Timisoara (RO); Alexandru Arion, Timisoara (RO)

(73) Assignee: Everseen Limited, Blackpool (IE)

(*) Notice: Subject to any disclaimer, the term of this patent is extended or adjusted under 35 U.S.C. 154(b) by 140 days.

(21) Appl. No.: 16/818,280

(22) Filed: Mar. 13, 2020

(65) Prior Publication Data
US 2020/0293959 A1    Sep. 17, 2020

Related U.S. Application Data

(60) Provisional application No. 62/818,883, filed on Mar. 15, 2019.

(51) Int. Cl.
*G06Q 10/06* (2012.01)
*G06F 16/23* (2019.01)
*G06F 21/62* (2013.01)

(52) U.S. Cl.
CPC ..... *G06Q 10/0633* (2013.01); *G06F 16/2365* (2019.01); *G06F 16/2379* (2019.01); *G06F 21/6218* (2013.01)

(58) Field of Classification Search
None
See application file for complete search history.

(56) References Cited

U.S. PATENT DOCUMENTS

2015/0221191 A1* 8/2015 Doyle ............... G06Q 10/08
340/568.1
2018/0285810 A1* 10/2018 Ramachandran ....... G06F 16/27
(Continued)

FOREIGN PATENT DOCUMENTS

JP    5866559 B2    2/2016
RU    2639015 C1    12/2017
(Continued)

OTHER PUBLICATIONS

Saveen A. Abeyratne . et al: 11 Blockchain Ready Manufacturing Supply Chain Using Distributed Ledger 11, IJRET: International Journal of Research in Engineering and Technology, vol. 05, No. 09, Sep. 25, 2016 (Sep. 25, 2016), pp. 1-10, XP055541754, Bangalore, India ISSN: 2321-7308, DOI: 10.15623/ijret.2016.0509001 pp. 7,9.
(Continued)

*Primary Examiner* — Alan Torrico-Lopez
(74) *Attorney, Agent, or Firm* — Young Basile Hanlon & MacFarlane, P.C.

(57) ABSTRACT

A system for anomaly monitoring in a pre-defined environment includes one or more image capturing devices configured to capture one or more images of the pre-defined environment in real-time, a process detecting component configured to detect one or more target processes based on captured image data, each target process representing a sequence of user activities in the pre-defined environment, a blockchain unit configured to store the one or more target processes and a reference process in form of a private distributed logbook, wherein each of the target processes and the reference process include a series of process transactions, wherein each process transaction is stored in an encrypted form in the blockchain unit, and an analysis unit communicatively coupled to the blockchain unit, and configured to analyse the private distributed logbook by com-
(Continued)

paring each target process with the reference process to determine one or more anomalies therein.

17 Claims, 3 Drawing Sheets

(56) References Cited

U.S. PATENT DOCUMENTS

2019/0037012 A1* 1/2019 Stocker ................. B29C 64/386
2020/0134209 A1* 4/2020 Zhang .................... G06F 21/64

FOREIGN PATENT DOCUMENTS

| WO | 2018037148 A1 | 3/2018 |
| WO | 2018063167 A1 | 4/2018 |
| WO | 2019152750 A1 | 8/2019 |

OTHER PUBLICATIONS

Melanie Swan: "Blockchain: Blueprint for a New Economy" In: 11 Blockchain: Blueprint for a New Economy 11, Feb. 8, 2015 (Feb. 8, 2015), O'Reilly, XP055279098, ISBN: 978-1-4919-2049-7 pp. 37,48.

Stephen Mckeon: 11 What is a blockchain token? 11, Aug. 29, 2018 (Aug. 29, 2018), XP055704371, Retrieved from the Internet: URL:https://web.archive.org/web/20180829024901/https://theconversation.com/what-is-a-blockchain-token-98916 [retrieved on Jun. 12, 2020] p. 1.

* cited by examiner

DISTRIBUTED LOGBOOK FOR ANOMALY MONITORING

TECHNICAL FIELD

The present disclosure relates generally to anomaly monitoring, and more specifically to a distributed logbook for automated flow validation and recording, with anomalies monitoring in a process.

BACKGROUND

Companies in all business sectors use various forms of business process management to manage and improve corporate performance. Process management methodologies include process management focused on process discovery, process comparison with expected process (meta process) and process shaping by feedback loop/interaction with the environment. The "AS-IS" process defines the current state of the business process in a particular organization. Typically, the analysis goal in putting together the current state process of a business, is to clarify exactly how the business process works today. However, today's "AS-IS" process formulation is simply a "best guess" and a "snapshot in time. In some enterprise environments, the management teams face the problem of designing, organising, and supervising existing ad-hoc processes.

Indeed, it is difficult to recognize various human actions, and to perform global tracking of the entities and activities that plays various roles in the considered environment. Examples of entities include, but are not limited to, employees, products, conveyors, industrial robots. Example of activities include, but are not limited to, operator entering or exiting the scene; picking, dropping, moving, weighting or scanning items; operating a touching display; and paying through a credit card. The transactions are part of a process mined/discovered using sensors and by analysing video feeds. There exists systems that facilitates designing and shaping processes based on recognition of various human actions and global tracking of various entities. However, such processes are susceptible to tampering, and also many times, it becomes difficult to find out whether the process has been followed to the quality standards imposed on the business.

Also, there could be multiple anomalies in the process flow that may remain undetected. If not detected at an early stage, they may lead to loss of efficiency and productivity in the process flow. For example, across the process of chocolate manufacturing, an anomaly may include the malfunctioning of a sugar feeding device resulting in a missing transaction from that chain.

In view of the above, there is a need for a method and system that overcomes the disadvantages associated with existing process shaping systems, and addresses the problem of trust and tampering in the process, along with detecting anomalies along the flow.

SUMMARY

In one aspect, there is provided a system for anomaly monitoring in a pre-defined environment. The system includes one or more image capturing devices configured to capture one or more images of the pre-defined environment in real-time. The system may further include a process detecting component configured to detect one or more target processes based on data captured by the one or more image capturing devices, each target process representing a sequence of user activities in the pre-defined environment. The system may further include a blockchain unit configured to store the one or more target processes and a reference process in form of a private distributed logbook, wherein each of the target processes and the reference process include a series of process transactions, wherein each process transaction is stored in an encrypted form in the blockchain unit. The system may further include an analysis unit communicatively coupled to the blockchain unit, configured to analyse the private distributed logbook by comparing each target process with the reference process to determine one or more anomalies therein, and transmit an alert message to report the one or more anomalies to a user.

In another aspect, there is provided a method for anomaly monitoring in a pre-defined environment. The method includes capturing one or more images \of the pre-defined environment in real-time. The method may include detecting one or more target processes based on data captured by the one or more image capturing devices, each target process representing a sequence of user activities in the pre-defined environment. The method may further include storing the one or more target processes and a reference process in form of a private distributed logbook, wherein each of the target processes and the reference process include a series of process transactions, wherein each process transaction is stored in an encrypted form in a blockchain unit. The method may further include analysing the private distributed logbook by comparing each target process with the reference process to determine one or more anomalies therein and transmitting an alert message to report the one or more anomalies to a user.

In yet another aspect, there is provided a computer programmable product for anomaly monitoring in a pre-defined environment. The computer programmable product comprises a set of instructions, the set of instructions when executed by a processor causes the processor to capture one or more images of the pre-defined environment in real-time, detect one or more target processes based on data captured by the one or more image capturing devices, each target process representing a sequence of user activities in the pre-defined environment, store the one or more target processes and a reference process in form of a private distributed logbook, wherein each of the target processes and the reference process include a series of process transactions, wherein each process transaction is stored in an encrypted form in a blockchain unit, and analyse the private distributed logbook by comparing each target process with the reference process to determine one or more anomalies therein and transmit an alert message to report the one or more anomalies to a user.

Embodiments of the present disclosure provide a system for providing a distributed logbook for automated flow validation and recording of processes in a process shaping system, wherein the distributed logbook is configured to, provide confidence that a process is unable to be tampered, facilitate a unique and improved quality assurance system across a range of industries, ensures that a process is secured and documented to be able to stand up to court or regulatory scrutiny, and provide an evidence chain for the customers.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
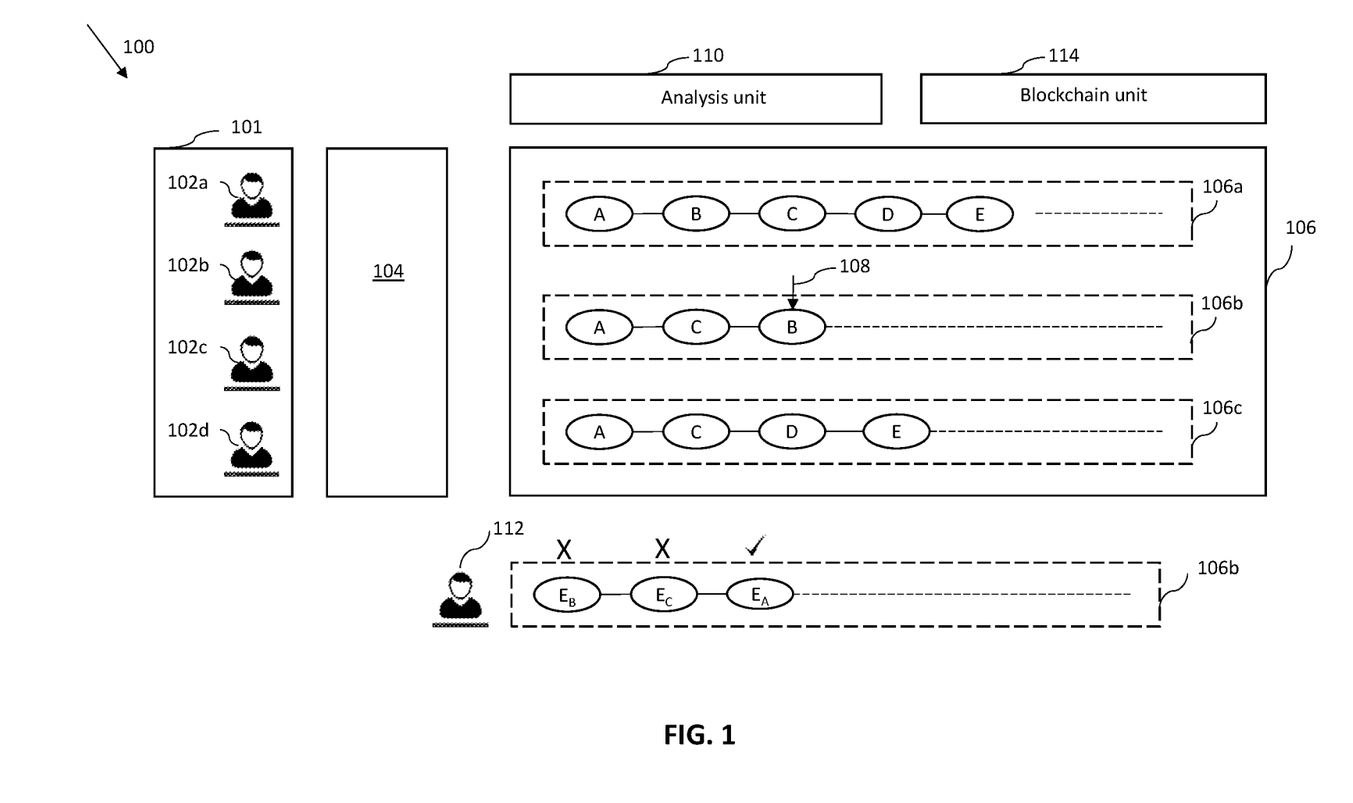
FIG. 1 illustrates a system for anomaly monitoring in a process, in accordance with an embodiment of the present disclosure.

FIG. 1 illustrates a system 100 for anomaly monitoring in a process, in accordance with an embodiment of the present disclosure.

The system 100 includes a pre-defined area 101 that may include first through four users 102a, 102b, 102c and 102d (hereinafter collectively referred to as users 102). The pre-defined area 101 may pertain to a self-checkout store (SCO) environment, and although not shown, the pre-defined area 101 may include entities such as products, conveyors, industrial robots, and activities such as an operator entering or exiting the scene; picking, dropping, moving, weighting or scanning items; operating a touchscreen display; and paying through cash, mobile electronic transactions, or a credit card. However, it would be apparent to one of ordinary skill in the art, that the system 100 may be implemented in other pre-defined areas such as a warehouse that includes supplier delivery, operators, conveyors, shelfs, and activities like receiving packages from suppliers, inspection, broken package rejection, sorting, dropping and picking from conveyors, storage on the shelf etc. The system 100 may also be useful in any general industrial pre-defined area involving components handling in production halls, which comprise in a large variety of ad-hoc or partially ad-hoc processes and therefore could not be understood and manually managed in a simple way.

The system 100 further includes a sensor unit 104 configured to combine the data from multiple sources extracting relevant information about what is occurring in the pre-defined area 101, and transforming it into transactions. The sensor unit 104 may include image capturing devices configured to capture one or more images, videos and sounds in real-time for recognizing actions of various entities of the pre-defined area 101, and performing global tracking of such entities. Examples of the image capturing devices include, but are not limited to, Closed-Circuit Television (CCTVs) cameras, High Definition (HD) cameras, non-HD cameras, handheld cameras, traffic cameras, police car cameras, and cameras on unmanned aerial vehicles (UAVs). The global tracking denotes the ability to continuously track an entity captured by one or many cameras configured to capture video information from various parts of the pre-defined area 101.

In an embodiment of the present disclosure, the sensor unit 104 may include a set of detectors and integrators for processing video and other signals and data streams to detect an equipment, an environment, one or more actions, one or more objects, or any combination thereof. The detectors may include sensing equipment such as PoS barcode reader.

The sensor unit 104 may further include a data source integration and aggregation component that is an interface to various other systems and equipment including and not limited to IoT devices, PoS systems, ERP solutions, and other systems of the pre-defined area 101. The data source aggregation and integration component performs the aggregation and integration of various information like video data, and PoS text information. In an embodiment of the present disclosure, the data source integration and aggregation component synchronizes the information originated from the various systems in order to extract and interpret the activities spanning over a certain period. The data source integration and aggregation component performs correlation of information associated with the same activity, that comes from various systems, and facilitates recognition of activities and matching of various parts of an observed process with predefined processes stored by ERP systems.

The sensor unit 104 may include a process sensing component configured to sense a continuous process as a sequence of events/actions for each channel or stream within the pre-defined area 101. A stream (or a data channel, used interchangeably) is the output of a certain sensor (e.g. a video camera). Each sensor may be responsible for capturing the events occurring in a specific portion of the pre-defined area 101 as a stream of samples acquired at a specific frequency. In an example, a camera positioned on top of a PoS scanner would capture a video stream covering the area where actions such as scanning a product bar code are expected to happen. In an embodiment of the present disclosure, the process sensing component may include various machine learning models related to computer vision and image processing associated with detecting instances of semantic objects of a certain class (such as humans, buildings, or cars) in digital images and videos.

The sensor unit 104 may further include a process aggregator and weighing component that is configured to aggregate the continuous processes of one or more channels, into a merged weighted process. The merged weighted process is the sensed process as seen by aggregating the individual processes discovered in each channel. In an example, a scanning process may be sensed using two different video cameras. The process sensing component may extract a chain of weighed actions corresponding to the portion of the environment covered by each camera, where the weights represent the recognition confidence. The process aggregator and weighing component may aggregate the two process representations based on a time-space correlation of each action. To merge two different actions that represent the same sequence in the scene, in case of contradictory evidence, the weights may be used for making a decision.

The data outputted by the sensor unit 104 may be illustrated with reference to a private distributed logbook 106 that includes a reference process 106a, and first and second processes 106b and 106c. Each of the reference processes 106a, first and second processes 106b and 106c include multiple process links evolving over time. In each of the reference process, and first and second processes, every entity represented between lines is a state that can be marked by a letter. The transactions are the lines connecting them. In the context of the present disclosure, the transactions may be posted only by pre-authorized parties, for example, billing machines, warehouse monitoring infrastructure, cost analysis, and Self check out stores (SCOs). The private distributed logbook 106 may be stored in a blockchain unit 114, wherein the blockchain unit 114 is formed of multiple distributed computing devices.

In the context of the present disclosure, the reference process 106a represents the process developed and implemented as standard by the business which is designed to achieve a specific level of performance and consequently value to the business. The reference process 106a implements dedicated Key Performance Indicators (KPIs) for the standard process allowing for evaluating the overall value of the process but also the contribution or impact of process links to the entire value of the process. The first and second processes 106a and 106b are real-time processes sensed by the sensor unit 104 and are supposed to be similar to the reference process 106a. Each process includes a process head, for example, the first process includes a process head 108 for indicating a most recent state of the transaction.

In an example, in a distribution center where parcels are received, processed and then distributed, the process link 'A' could be loading and unloading of parcels from courier vans, the process link 'B' could be processing parcels, and the process link 'C' could be distributing parcels. In another example, in a chocolate making center, the process link 'A' could be melting, the process link 'B' represents the adding sugar, and the process link 'C' could be heating. Thus, the process links A, B, C are successive states of the chocolate making process. A process head is a reference to the last state regarding one instance of a process. For example, in the chocolate making process, the process head moves along by firstly pointing to the process link 'A', then pointing to the process link 'B', and then pointing to the process link 'C'.

The system 100 further includes an analysis unit 110 that is a global unit backed by the mining process on a distributed network implementing blockchain technology. The distributed network that implements blockchain technology is hereinafter referred to as a blockchain unit 114.

Figure 2:
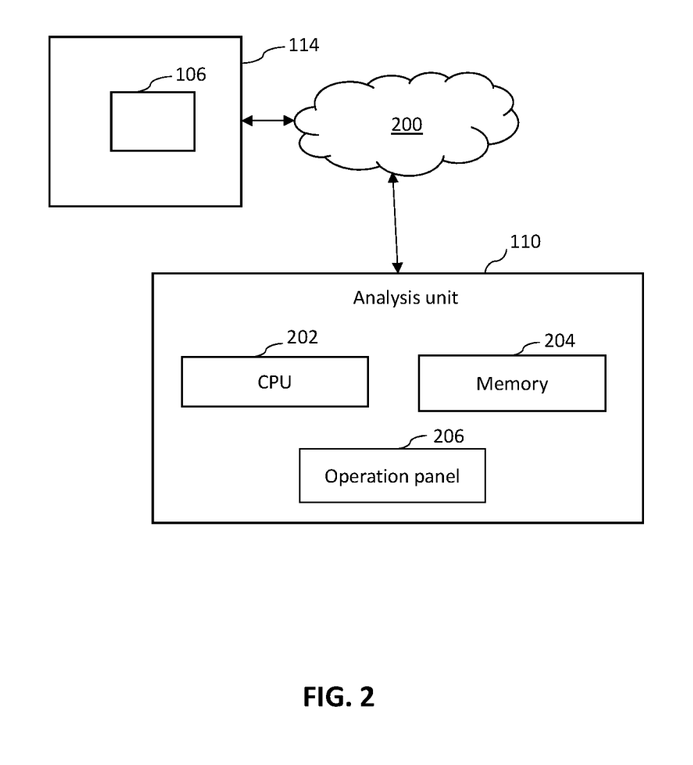
FIG. 2 illustrates an analysis unit in detail, in accordance with an embodiment of the present disclosure.

FIG. 2 illustrates the analysis unit 110 in detail, in accordance with an embodiment of the present disclosure. The analysis unit 110 is communicatively coupled to the blockchain unit 114 through a communication network 200. The analysis unit 110 is a global unit backed by the mining process on the distributed network, through a communication network 200. The analysis unit 110 includes a central processing unit (CPU) 202, a memory 204, and an operation panel 206. The CPU 202 is a processor, computer, microcontroller, or other circuitry that controls the operations of various components such as the operation panel 206, and the memory 204. The CPU 202 may execute software, firmware, and/or other instructions, for example, that are stored on a volatile or non-volatile memory, such as the memory 204, or otherwise provided to the CPU 202. The CPU 202 may be connected to the operation panel 206, and the memory 204, through wired or wireless connections, such as one or more system buses, cables, or other interfaces. In an embodiment of the present disclosure, the CPU 202 may include a custom Graphic processing unit (GPU) server software to provide real-time object detection and prediction, for all cameras on a local network.

The operation panel 206 may be a user interface for the analysis unit 110, and may take the form of a physical keypad or touchscreen. The operation panel 206 may receive inputs from one or more users relating to selected functions, preferences, and/or authentication, and may provide and/or receive inputs visually and/or audibly.

The memory 204, in addition to storing instructions and/or data for use by the CPU 202 in managing operation of the analysis unit 110, may also include user information associated with one or more users of the analysis unit 110. For example, the user information may include authentication information (e.g. username/pas sword pairs), user preferences, and other user-specific information. The CPU 202 may access this data to assist in providing control functions (e.g. transmitting and/or receiving one or more control signals) related to operation of the operation panel 206, and the memory 204.

In an embodiment of the present disclosure, the analysis unit 110 is configured to analyse the private distributed logbook 106 by comparing the first and second processes 106b and 106c with the reference process 106a to determine any anomalies or deviations therein. The analysis unit 110 is configured to illustrate each chain evolution over time describing how the chain and the transactions are laid out, the anomalies found and flagged, how the target chain looks like for comparison and where the process head is at the moment. For example, in the chocolate making process, the analysis unit 110 may find the missing link in the chain (sugar from the above example) and flags the chain as invalid by highlighting the anomaly.

Referring to both FIGS. 1 and 2, each transaction of a process such as the second process 106b is stored in an encrypted form in the blockchain unit 114 for analysis by a miner 112. The miner 112 performs the mining process by access to limited encrypted information. In an example, the encrypted transaction may contain transaction type, link to previous transaction, encrypted metadata, and the transaction hash. The miner 112 has access only to the cryptograph hash and the type of transaction in order to prevent any tampering. In the context of the present disclosure, the encrypted information may include data that refers to all sensorial input sensorial data and metadata generated, source that represents the link to the previous transaction, type that represents the state identified by the sensor unit 104. In the context of the present disclosure, the type may be used as a destination in the blockchain unit 114, and hash is the result of the cryptographic operation of hashing applied to the combined string of all parameters described above.

In an embodiment of the present disclosure, the miner 112 may analyse the second process 106b in a reverse order with respect to the reference process 106a, and find a difference from the reference process 106a. The analysing a process in a reverse order means initiating analysis of the first transaction of the process, instead of initiating analysis of most recent transaction of the process.

For example, by analysing in the reverse order, the first transaction of the second process 106b is matched with a first transaction of the reference process 106a. Upon a successful match, the second transaction of the second process 106b is matched with a second transaction of the reference process 106a, and so on. The second process 106b is represented by A→C→B, however, it should be A→B→C with respect to the reference process 106a, therefore, second and third transactions of the second process 106b are incorrect. In an embodiment of the present disclosure, the mining process is an automated process performed by the analysis unit 110 on transaction data stored in form of blockchains in the blockchain unit 114.

In an embodiment of the present disclosure, for each target process such as the second process 106b, there is a token created by the governing authority, and is used along the transactions comprising the chain of that process. The token is created once for each instance of a process representing a unique identifier for that instance. The token may be used to link a chain of transaction and provide ability to pinpoint each instance of the process.

In an embodiment of the present disclosure, for each target process, there is a token created by the governing authority which can be used along the transactions comprising the chain of that process. The blockchain unit 114 may store transactions using the generic blockchain format alongside secure encapsulated state and sensorial definitions and also a reference to the last transaction. Further, the blockchain unit 114 may not only store transactions, but rather store process markers which when assembled allow for the verification of an entire process or process segment depending on verification query type, to assure the quality and genuineness of the product.

In an embodiment of the present disclosure, the private distributed logbook 106 is mined to ensure that the process is valid, i.e. it follows the expected sequence. The mining procedure uses the process head and the back indicators from each state to navigate backwards in the recorded process sequence. If an unexpected state is found during the navigation, then an anomaly is detected.

Further, every time an authorized transaction is made, the process head is calculated and transferred to the new transaction. The data field representing the process head of each instance stores the address of the last state posted to the private distributed logbook 106. The private distributed Logbook 106 facilitates to show that the process has been followed to the quality standards imposed on the business. For example, if a compliance or quality issues appears in relation to a product on the market, the manufacturing plant may prove (or not) that they followed the correct process. The private distributed logbook 106 solves the problem of trust and tampering with any type of lifecycle or process, in the meantime detecting anomalies along the flow. It follows the process starting from the last transaction called process head along the way, comparing with reference predefined chain. The transactions that do not match the predefined flows may be flagged as anomalies.

The private distributed logbook 106 provides confidence that any process or supply chain is unable to be tampered with using a unique approach as part of its process shaping domain. The inferred process is documented, so that it cannot be tampered with after it has been approved. The private distributed logbook 106 facilitates a unique and improved quality assurance system across a range of industries such as auto, pharma, power, medical and military. The private distributed logbook 106 ensures that any process is secured and documented to be able to stand up to court or regulatory scrutiny. The private distributed logbook 106 provides an evidence chain for the customers. The mining is performed by the analysis unit on the data stored in form of a private distributed logbook 106.

In the private distributed logbook 106, each process step can be verified individually and, in its entirety, to ensure compliance with any special manufacturing requirements set out by law such as Pharmaceutical Food and Drug Administration (FDA) regulation, or more interestingly, prevention of knockoff and copying of high end consumer items such as handbags and sunglasses, or to attest to the authenticity of medications. This could be achieved because the manufacturing blockchain would store a database and the consumer could submit a code on the product to an online query system using an application supplied by the manufacturer, using the code, interrogate the blockchain to confirm the validity of the product ensuring that the customer had in fact purchased a product which was manufactured by the manufacturer i.e. a valid and genuine product.

Figure 3:
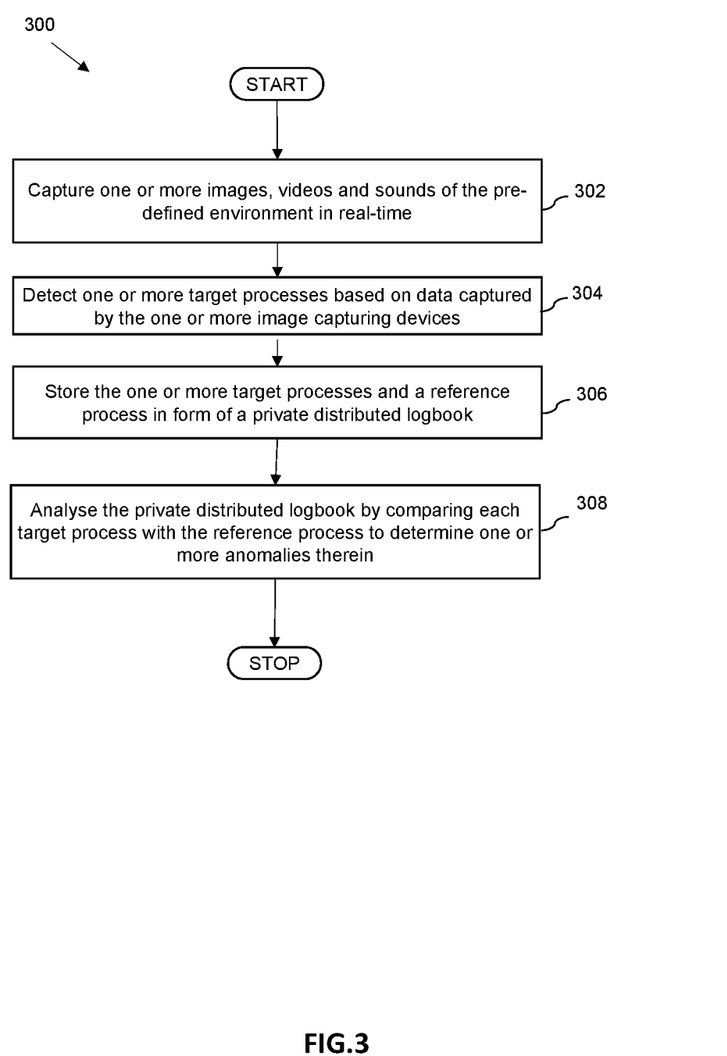
FIG. 3 is a flowchart illustrating a method for anomaly monitoring in a process, in accordance with an embodiment of the present disclosure.

FIG. 3 is a flowchart illustrating a method for anomaly monitoring in a process, in accordance with an embodiment of the present disclosure.

At step 302, one or more images, videos and sounds of the pre-defined environment are captured in real-time using image capturing devices. Examples of the image capturing devices include, but are not limited to, Closed-Circuit Television (CCTVs) cameras, High Definition (HD) cameras, non-HD cameras, handheld cameras, traffic cameras, police car cameras, and cameras on unmanned aerial vehicles (UAVs).

At step 304, one or more target processes are detected based on data captured by the one or more image capturing devices, where each target process represents a sequence of user activities in the pre-defined environment.

At step 306, the one or more target processes and a reference process are stored in form of a private distributed logbook, wherein each of the target processes and the reference process include a series of process transactions, wherein each process transaction is stored in an encrypted form in a blockchain unit. In an embodiment of the present disclosure, an encrypted transaction includes a transaction type, a link to a previous transaction, an encrypted metadata, and a transaction hash, wherein the transaction hash is a result of a cryptographic operation of hashing applied to a combined string of the transaction type, the link to the previous transaction and the encrypted metadata. Further, the reference process represents a process developed and implemented as standard by corresponding business and is designed to achieve a predefined level of performance and value to the business. In another embodiment of the present disclosure, for each target process, a token is created by a governing authority once for each instance of a process representing a unique identifier for that instance, and is used along with transactions of corresponding target process, and to link a chain of transaction and provide ability to pinpoint each instance of the process.

At step 308, the private distributed logbook is analysed by comparing each target process with the reference process to determine one or more anomalies therein. In an embodiment of the present disclosure, each target process is analysed in a reverse order with respect to the reference process to find a deviation therein, wherein a current process transaction of a target process is compared with a current process transaction of the reference process, when a previous process transaction of the target process matches with a previous process transaction of the reference process.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for anomaly monitoring in a pre-defined environment, the system comprising:
   one or more image capturing devices configured to capture one or more images, of the pre-defined environment in real-time;
   a process detecting component configured to detect one or more target processes based on data captured by the one or more image capturing devices, each target process representing a sequence of user activities in the pre-defined environment;
   a blockchain unit configured to store the one or more target processes and a reference process in form of a private distributed logbook, wherein each of the target processes and the reference process include a series of process transactions, wherein each process transaction is stored in an encrypted form in the blockchain unit; and
   an analysis unit communicatively coupled to the blockchain unit, and configured to analyse the private distributed logbook by comparing each target process with the reference process to determine one or more anomalies therein and transmit an alert message to report the one or more anomalies to a user in response to one or more determined anomalies, wherein the analysis unit analyses each target process in a reverse order with respect to the reference process to find a deviation therein, and wherein the analysis unit compares a current process transaction of a target process with a current process transaction of the reference process when a previous process transaction of the target process matches with a previous process transaction of the reference process.

2. The system of claim 1, wherein one or more process transactions are posted by one or more billing machines, one or more warehouse monitoring systems, one or more cost analysis systems, or one or more Self check out stores (SCOs).

3. The system of claim 1, wherein the analysis unit includes a central processing unit (CPU), a memory, and an operation panel.

4. The system of claim 1, wherein an encrypted transaction includes a transaction type, a link to a previous transaction, an encrypted metadata, and a transaction hash, wherein the transaction hash is a result of a cryptographic operation of hashing applied to a combined string of the transaction type, the link to the previous transaction and the encrypted metadata.

5. The system of claim 1, wherein the reference process represents a process developed and implemented as standard by corresponding business and is designed to achieve a predefined level of performance and value to the business.

6. The system of claim 1, wherein for each target process, the blockchain unit is configured to obtain a token from a governing authority once for each instance of a process, use the token along with transactions of a corresponding target process, and link a chain of transactions and provide an ability to pinpoint each instance of the process.

7. The system of claim 1, wherein the process detecting component comprises:
   a set of detectors and integrators for processing the one or more captured images to detect one or more equipment, one or more actions, one or more objects, and one or more users in the pre-defined environment;
   a data source integration and aggregation component configured to aggregate and integrate processed image and video data with Internet of Things (IoT) devices, Point of Sale (PoS) systems, and Enterprise Resource Planning (ERP) systems for extracting and interpreting one or more user activities spanning over a predefined interval;
   a process sensing component configured to generate one or more continuous processes based on aggregated and integrated information; and
   a process aggregator and weighing component configured to aggregate one or more continuous processes into a merged weighted process, and to perform process model extraction, virtualized process modelling, and anomalies detection.

8. A method for anomaly monitoring in a pre-defined environment, the method comprising:
   capturing one or more images of the pre-defined environment in real-time;
   detecting one or more target processes based on data captured by the one or more image capturing devices, each target process representing a sequence of user activities in the pre-defined environment;
   storing the one or more target processes and a reference process in form of a private distributed logbook, wherein each of the target processes and the reference process include a series of process transactions, wherein each process transaction is stored in an encrypted form in a blockchain unit; and
   analysing the private distributed logbook by comparing each target process with the reference process to determine one or more anomalies therein and transmit an alert message to report the one or more anomalies to a user in response to one or more determined anomalies, wherein each target process is analysed in a reverse order with respect to the reference process to find a deviation therein, and wherein a current process transaction of a target process is compared with a current process transaction of the reference process when a previous process transaction of the target process matches with a previous process transaction of the reference process.

9. The method of claim 8, wherein one or more process transactions are posted by one or more billing machines, one or more warehouse monitoring systems, one or more cost analysis systems, or one or more Self check out stores (SCOs).

10. The method of claim 8, wherein an encrypted transaction includes a transaction type, a link to a previous transaction, an encrypted metadata, and a transaction hash, wherein the transaction hash is a result of a cryptographic operation of hashing applied to a combined string of the transaction type, the link to the previous transaction and the encrypted metadata.

11. The method of claim 8, wherein the reference process represents a process developed and implemented as standard by corresponding business and is designed to achieve a predefined level of performance and value to the business.

12. The method of claim 8 further comprising obtaining a token from a governing authority for each target process once for each instance of a process, using the token along with transactions of a corresponding target process, linking the token a chain of transactions and providing ability to pinpoint each instance of the process.

13. The method of claim 8, wherein the detecting one or more target processes comprises:

detecting one or more equipment, one or more actions, one or more objects, and one or more users in the pre-defined environment;

aggregating and integrating processed image and video data with Internet of Things (IoT) devices, Point of Sale (PoS) systems, and Enterprise Resource Planning (ERP) systems for extracting and interpreting one or more user activities spanning over a predefined interval;

generating one or more continuous processes based on aggregated and integrated information; and aggregating one or more continuous processes into a merged weighted process, and to perform process model extraction, virtualized process modelling and anomalies detection.

14. A non-transitory computer readable medium configured to store a program, that when executed by a processor, causes the processor to:

capture one or more images of the pre-defined environment in real-time;

detect one or more target processes based on data captured by the one or more image capturing devices, each target process representing a sequence of user activities in the pre-defined environment;

store the one or more target processes and a reference process in form of a private distributed logbook, wherein each of the target processes and the reference process include a series of process transactions, wherein each process transaction is stored in an encrypted form in a blockchain unit; and analyse the private distributed logbook by comparing each target process with the reference process to determine one or more anomalies therein and transmit an alert message to report the one or more anomalies to a user in response to one or more determined anomalies, wherein each target process is analysed in a reverse order with respect to the reference process to find a deviation therein, and wherein a current process transaction of a target process is compared with a current process transaction of the reference process when a previous process transaction of the target process matches with a previous process transaction of the reference process.

15. The non-transitory computer readable medium of claim 14, wherein an encrypted transaction includes a transaction type, a link to a previous transaction, an encrypted metadata, and a transaction hash, wherein the transaction hash is a result of a cryptographic operation of hashing applied to a combined string of the transaction type, the link to the previous transaction and the encrypted metadata.

16. The non-transitory computer readable medium of claim 14, wherein the reference process represents a process developed and implemented as standard by corresponding business and is designed to achieve a predefined level of performance and value to the business.

17. The non-transitory computer readable medium of claim 14, wherein the program, when executed by the processor further causes the processor to obtain a token from a governing authority for each target process once for each instance of a process, to use the token along with transactions of a corresponding target process, to link the token with a chain of transactions and provide ability to pinpoint each instance of the process.

* * * * *